United States Patent [19]

Mertz

[11] 4,308,478
[45] Dec. 29, 1981

[54] LUBRICATION SYSTEM FOR DYNAMOELECTRIC MACHINE

[75] Inventor: Richard F. Mertz, St. Charles, Mo.

[73] Assignee: Emerson Electric Co., St. Louis, Mo.

[21] Appl. No.: 14,133

[22] Filed: Feb. 22, 1979

[51] Int. Cl.³ .............................................. H02K 5/16
[52] U.S. Cl. ..................................................... 310/90
[58] Field of Search .................. 310/90; 308/132, 125

[56] References Cited
U.S. PATENT DOCUMENTS

| | | | |
|---|---|---|---|
| 3,434,765 | 3/1969 | Abel | 308/132 |
| 3,793,543 | 2/1974 | Stokke | 308/132 |
| 3,885,176 | 5/1975 | Cunningham | 310/90 |
| 3,941,438 | 3/1976 | Charlton | 308/132 |
| 4,055,370 | 10/1979 | Cunningham | 308/132 |
| 4,090,749 | 5/1978 | Daniels | 308/132 |

Primary Examiner—Skudy R.
Attorney, Agent, or Firm—Polster, Polster and Lucchesi

[57] ABSTRACT

A lubrication system for an electric motor or other dynamoelectric machine in which a first or lubricant applying wick is inserted into a receptacle in the hub of the end shield of the motor. A first portion of this wick extends inwardly toward the rotor shaft for contact therewith and for the application of lubricant thereto. Another portion of this wick is tapered (i.e., inclined with respect to the longitudinal centerline of the motor) and cammingly engages a portion of the hub when the wick is retained in its installed position so as to urge or force the first portion of the wick inwardly toward the shaft and to positively maintain lubricant applying contact between the wick and the shaft. A reservoir wick engages the first wick so as to supply lubricant to the first wick.

4 Claims, 8 Drawing Figures

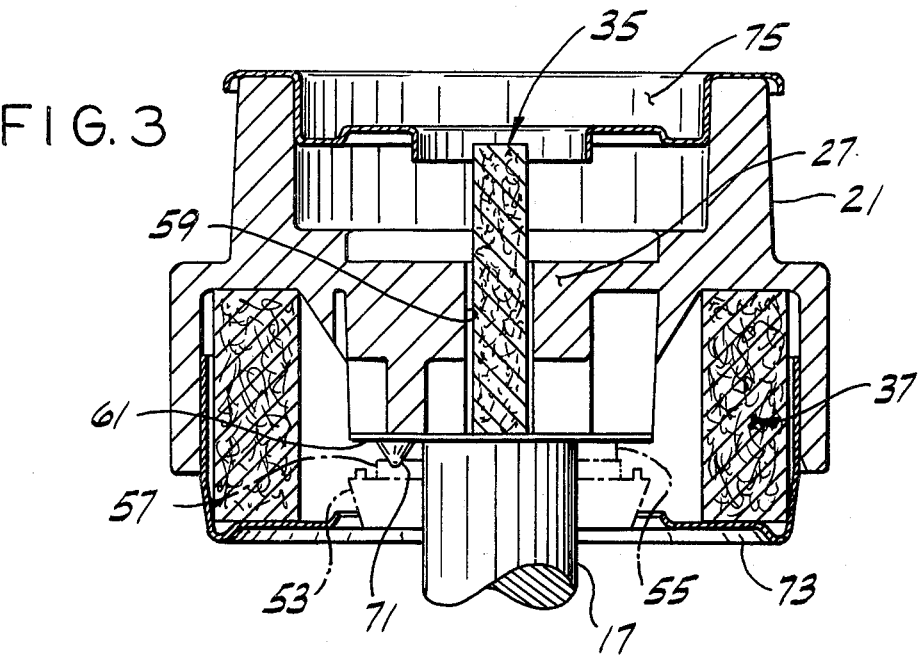
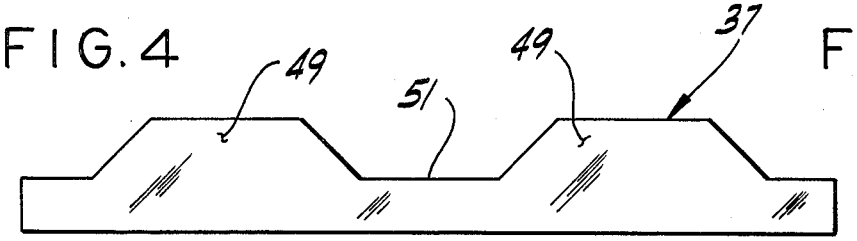
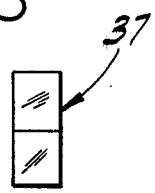
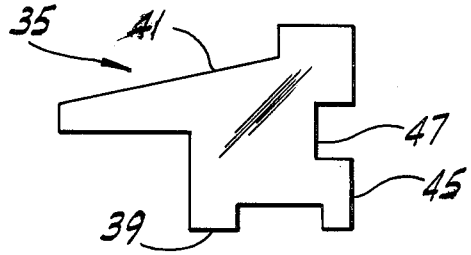
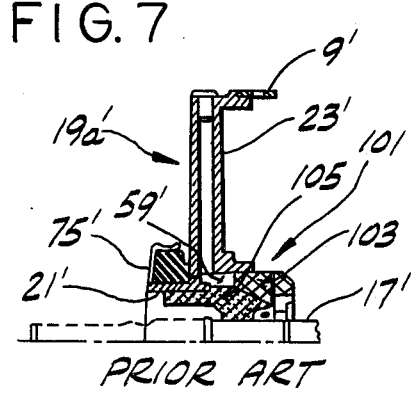
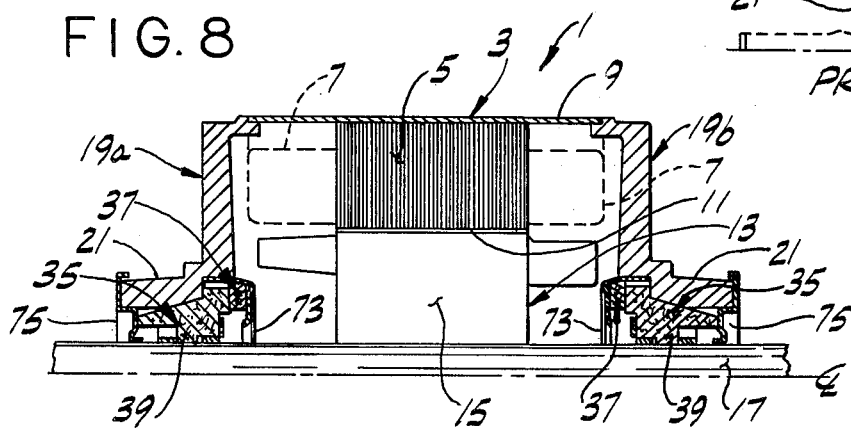

LUBRICATION SYSTEM FOR DYNAMOELECTRIC MACHINE

BACKGROUND OF THE INVENTION

This invention relates to a lubrication system for use with an electric motor or other dynamoelectric machine and is more particularly concerned with a wick-type lubrication system.

In many electric motor designs, the rotor shaft of the motor is journalled in bushings or sleeve bearings which are pressed into respective openings in the hubs of the end shields at the opposite ends of the motor. Each of the bearings and the shaft journalled therein is typically lubricated by a thin film of oil or other lubricant fed into the sleeve bearing and onto the shaft by means of a felt wick carried within each of the end shields. Typically, prior art motor lubrication systems (such as illustrated in FIG. 7) utilize a feeding wick which contacts the rotating shaft through a window provided in the bushing or sleeve bearing. In turn, this feeding wick is in contact with a lubricant impregnated reservoir wick for continuously supplying lubricant to the feeding wick.

However, certain problems were encountered with many of these prior art wick-type lubrication systems. For example, it was difficult for a production worker on an assembly line to manually install the feeding wick within the hub of the end shield. In many instances, it was necessary for the worker to physically deform or bend the feeding wick from its "as formed" shape so as to enable it to be inserted into the end shield hub. Also, in certain instances, it was found that the feeding wick would not always make and maintain lubricating contact with the shaft and thus it would not properly lubricate the shaft.

SUMMARY OF THE INVENTION

Among the several objects and features of this invention may be noted the provision of a wick-type lubrication for an electric motor or other dynamoelectric machine in which the feeding wick may be readily and easily installed in its proper lubricating position within the bearing hub of the end shield of the motor;

The provision of such a lubrication system in which contact between the feeding wick and the shaft to be lubricated is ensured upon installation of the feeding wick and is positively maintained thus increasing the service life of the motor;

The provision of such a lubrication system which, in addition to lubricating the shaft, also lubricates a thrust plate bearing;

The provision of such a lubrication system which prevents assembly of the motor unless the feeding wick and its retainer are properly installed;

The provision of such a lubrication system in which the end fibers of the feeding wick and the reservoir wick contact one another so as to enhance the feeding of lubricant from the reservoir wick to the feeding wick;

The provision of such a lubrication system in which the reservoir wick may be manufactured with less waste or scrap of wick material and thus is less costly to manufacture than prior reservoir wick designs;

The provision of such a lubrication system which, upon assembly of the lubrication system, provides the installer of the wick with a tactile indication of when the wick has been properly installed in the motor hub; and The provision of such a lubrication system which may be readily incorporated in a wide variety of motor designs, which is no more expensive than prior lubrication systems and which is easy to install.

The lubrication system of this invention is intended for use in an electric motor or other dynamoelectric machine having a stator assembly with a bore therein, a rotor assembly including a rotor shaft, a bearing for rotatably journalling the shaft with the rotor assembly received in the bore and further having a support for the bearing. Generally, the bearing has an opening therethrough for the application of lubricant to the bearing and to the portion of the shaft journalled within the bearing. A portion of the bearing support is spaced generally radially outwardly of the bearing opening. The improvement of this invention comprises a feeding wick of lubricant absorbent material having a first portion adapted to be inserted in the opening in the bearing for engagement with the shaft. The feeding wick further has a second portion inclined with respect to the longitudinal axis of the motor for cammingly engaging the above-noted portion of the bearing support when the feeding wick is in its installed position thereby to urge the first portion of the feeding wick inwardly and to positively maintain lubricating contact between the feeding wick and the shaft. A retaining member adapted to be held in position on the bearing structure holds the feeding wick in its installed position. A reservoir wick is engageable with the feeding wick thereby to supply lubricant to the feeding wick.

Other objects and features of this invention will be in part apparent and in part pointed out hereinafter.

BRIEF DESCRIPTION OF THE DRAWINGS

FIG. 3 is a cross sectional view taken along line 3—3 of FIG. 2;

FIG. 4 is a flat pattern layout of a reservoir wick incorporated in the lubrication system of the present invention;

FIG. 5 is an end elevational view of the reservoir wick shown in FIG. 4;

FIG. 6 is a side elevational view of a feeding wick;

FIG. 7 is a cross sectional view of a portion of an electric motor showing a typical prior art lubrication system; and FIG. 8 is a longitudinal cross sectional view of one half of a typical electric motor incorporating a lubrication system of the present invention.

Corresponding reference characters indicate corresponding parts throughout the several views of the drawings.

DESCRIPTION OF A PREFERRED EMBODIMENT

Figure 1:
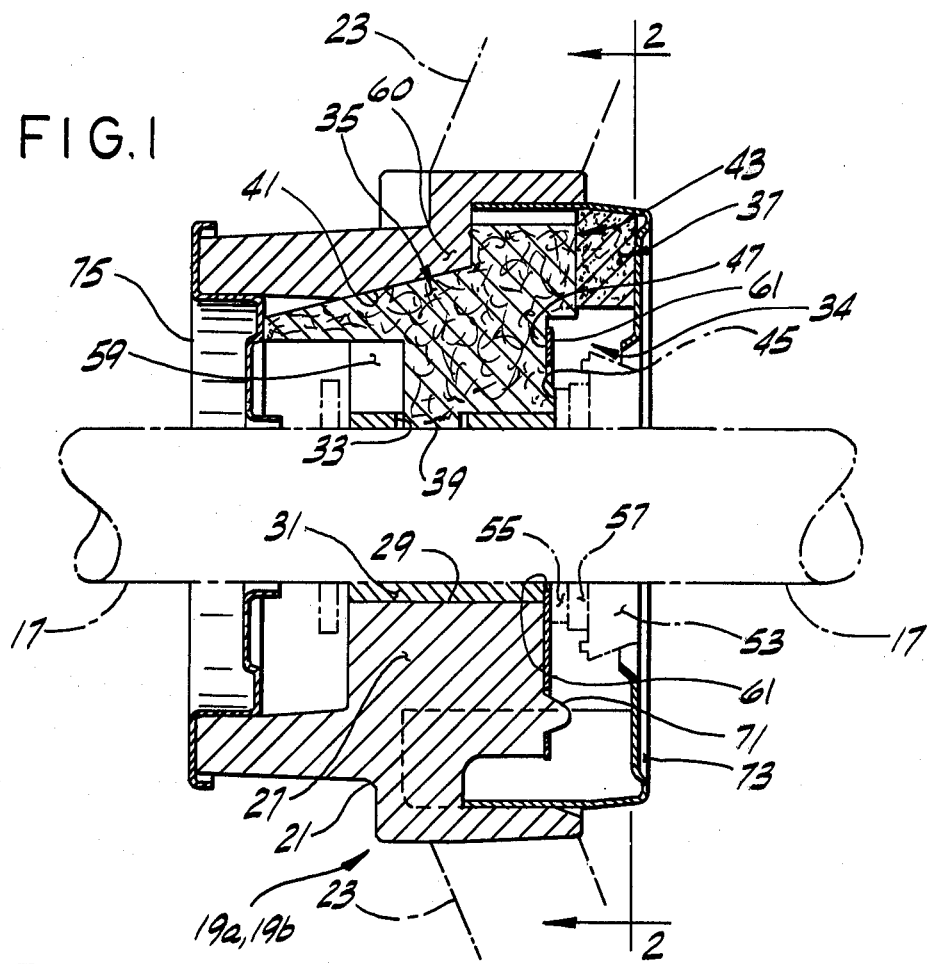
FIG. 1 is an enlarged vertical cross section of the hub portion of an electric motor end shield illustrating the improved lubrication system of the present invention with parts of the end shield broken away and with the rotor shaft and thrust flanges affixed to the rotor shaft and with portions of the end shield supporting the hub being shown in phantom.

Referring now the drawings, and in particular to FIG. 8, an electric motor is indicated in its entirety by reference character 1. The motor is shown to have a stator assembly 3 including a core 5, stator windings 7 inserted into slots in the core, and a shell 9 enclosing the core. A bore 11 is provided within the core and a rotor assembly 13 including a squirrel-cage type rotor body 15 is positioned within the bore. A rotor shaft 17 extends from the rotor body and is journalled in a pair of end shields 19a, 19b secured to the stator assembly. Each end shield is shown to be a unitary casting having a central hub 21 with outwardly extending legs 23 and an outer rim 25 engageable with the stator assembly. The end shields may, of course, be securely fastened to the stator assembly in any one of a number of ways (e.g., bolted).

Figure 2:
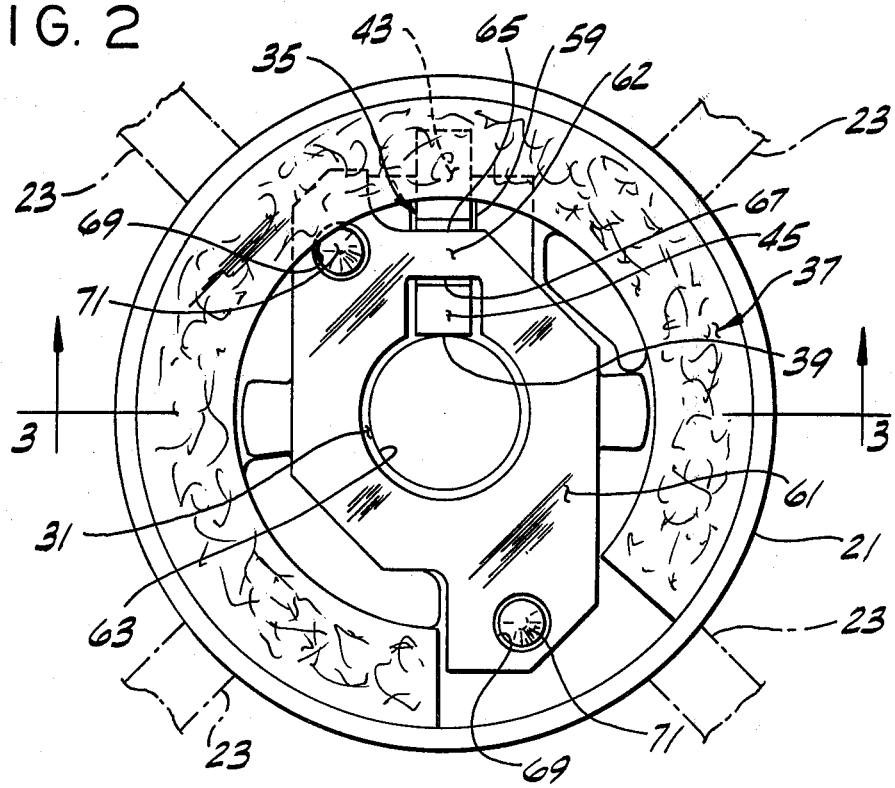
FIG. 2 is a cross sectional view taken along line 2—2 of FIG. 1.

In FIGS. 1-3, end shield hub 21 is shown in greatly enlarged scale and is further shown to be in the form of a cup with its open face toward the interior of the motor. A pillow 27 is disposed within the hub with the pillow having a bore 29 therethrough. A sleeve bearing or bushing 31 is pressed into bore 29. For example, this sleeve bearing may be a babbit bearing which is intended to be lubricated by a light film of oil or other lubricant. Sleeve bearing 31 has an opening or window 33 therethrough for purposes as will appear.

As generally indicated at 34 (see FIG. 1), a lubrication system of this invention is incorporated in end shield hub 21. This lubrication system comprises a first or so-called feeding wick 35 and a second or reservoir wick 37 with the two wicks being in lubricant feeding relation (i.e., in contact) with one another.

As best shown in FIGS. 1 and 6, wick 35 has a first portion 39 adapted to fit into and to project through window 33 in sleeve bearing 31 so as to contact shaft 19 and to apply lubricant to the shaft and to the bearing. This wick further has a second portion 41 (also referred to as a surface) which is inclined (or tapered) with respect to the longitudinal axis of motor 1 (i.e., the axis of shaft 17). As shown, this inclined or tapered surface 41 angles inwardly toward shaft 17 at an angle of about 15 degrees. A third portion 43 of wick 35 projects longitudinally inwardly of motor 1 so as to contact reservoir wick 37 thereby to enable the transfer of lubricant from the reservoir wick 37 to feeding wick 35. A fourth portion of wick 35 also extends longitudinally inwardly toward the motor for purposes as will appear. A groove 47 separates the third and fourth portions 43 and 45 of wick 35 from one another.

Reservoir wick 37 is an elongate wick (see FIG. 4) adapted to be bent or otherwise formed in circular fashion and inserted into hub 21 (see FIG. 2). Wick 37 has two increased depth portions 49 (see FIG. 4) which fit into recesses in the hub and a reduced depth portion 51 which engages portion 43 of wick 35. Wicks 35 and 37 are made of lubricant absorbent material, such as a suitable felt material. Preferably, the felt material from which the wicks 35 and 37 are made are so selected that feeding wick 35 can draw lubricant from reservoir wick 37. It is a particular feature of this invention that the ends of the fibers in wick 35 contact the ends of the fibers in reservoir wick 37 thereby to enhance the flow of lubricant from the reservoir wick to the feeding wick.

As shown in FIG. 1, shaft 17 has a flange 53 (preferably of nylon or other suitable synthetic resin material) pressed onto or otherwise affixed to the shaft and being rotatable therewith for the purpose of transfering axial thrust loads between rotor assembly 13 and end shields 19a, 19b via a thrust washer 55. An elastomeric ring 57 is interposed between flange 53 and thrust washer 55.

In FIG. 1, wick 35 is shown in its installed position within a receptacle 59 provided in pillow 27. A portion 60 of the pillow forming receptacle 59 is spaced opposite window 33 and sleeve bearing 31 a distance sufficient to permit wick 35 to be readily slipped into its installed position from the end side of hub 21. As wick 35 is inserted into its installed position, portion 41 of the wick cammingly engages hub portion 60 thereby to force wick portion 39 inwardly through window 33 into lubricating engagement with shaft 17.

As best shown in FIG. 2, a retainer plate 61 is fitted onto the inner surface of pillow 27 with a portion 62 of the retainer plate overlying groove 47 of wick 35 so as to positively hold the wick in its installed position. Retainer plate 61 has a central opening 63 therethrough so as to accommodate shaft 17 and notches or openings 65 and 67 so as to permit wick portions 43 and 45, respectively, to extend longitudinally inwardly of the motor through the retainer plate. Thus, wick portion 43 may readily make lubricant feeding contact with reservoir wick 37 and wick portion 45 makes lubricant applying contact with thrust washer 55 thereby to ensure a steady supply of lubricant to the thrust washer (see FIG. 1).

Retainer plate 61 has a pair of locating openings 69 formed therein. Pillow 27 has a pair of alignment pins 71 which are received in openings 69 thereby to align the retainer plate in proper position with the pillow 27 so that opening 63 and sleeve bearing 31 are coaxial and so that notches 65 and 67 are aligned with wick portions 43 and 45. In order to prevent the improper installation of retainer plate 61, pins 71 are so positioned on pillow 27 that they are asymmetrical with respect to an axis of the opening in sleeve bearing 31. Thus, the retainer plate can only be installed in the position shown in FIG. 2 with wick portions 43 and 45 in register with notches 65 and 67.

It will be appreciated that with retainer plate 61 installed and with motor 1 assembled, the thrust washer bearing 55 bears against the inner face of the retainer plate which in turn bears against pillow 27. Thus, the retainer plate acts like a wearing surface for the thrust washer. In addition to aligning the retainer plate in its proper position, pins 71 also serve to prevent rotation of the retainer plate with respect to the end shield. Also, the retainer plate applies pressure on wick 35 pushing it further into its receptacle 59 and thereby maintaining camming engagement between wick portion 41 and hub portion 60. This in turn cammingly forces wick portion 39 inwardly so as to positively maintain lubricant applying engagement between wick portion 35 and shaft 17.

Wick 37 is maintained in its installed position (as shown in FIG. 2) by means of a cap 73 of formed sheet metal or the like which is pressed into the open face of the inner cup of hub 21. Wick 37 is forced inwardly into hub 21 by cap 73 and is thus held in engagement with wick 35. This in turn also forces wick 35 into receptacle 59. Cap 73 also serves to retain lubricant in wick 37 and to prevent the escape of lubricant. Another cap 75 is pressed into the outer opening of hub 21 so as to protect sleeve bearing 31.

As can be best appreciated by studying FIG. 1, upon assembly of the motor wick 35 may be readily and easily pushed into its installed position by first inserting tapered portion 41 into receptacle 59 and by pushing the wick. The distance from the inner end of wick portion 39 and of tapered surface 41 of wick 35 is such that the wick may be pushed almost fully to its installed position without any appreciable deformation of the wick. As wick portion 39 moves into register with window 33, a slight amount of compressive force present in the wick relaxes as wick portion 39 "snaps" into position within the window. In addition to holding the wick in its installed position, this "snapping into place" action of the wick provides the installer with a tactile indication that the wick has been properly installed.

In FIG. 7, a typical prior art motor lubrication system is shown with the parts of this prior art motor and the lubrication system having a structure and function similar to those heretofore described in regard to the present invention being indicated by "primed" reference characters.

As generally indicated at 101 in FIG. 7, a typical prior art lubrication system is provided has a feeder wick 103 and a reservoir wick 105. The feeding wick of this prior art lubrication system is inserted into its receptacle 59' in hub 21' from the inside of the end shield. It will be noted, however, that there is no means (other than reservoir wick 105) for holding wick 103 in lubricating engagement with shaft 17'. In the event wick 103 would partially dry out or otherwise loose its initial shape, the feeding wick may shrink away from shaft 17. Thus, insufficient lubricant would be applied to the shaft. It will further be noted that wick 103 must undergo substantial deformation or bending as it is installed which may damage the wick.

While the lubricating system of the present invention has been herein disclosed as being installed in the hub of the end shield of an electric motor, it will be understood that within the broader aspects of the lubrication system of this invention, it may be installed in any type of bearing support structure and it is not limited to installation in an end shield.

In view of the above, it will be seen that the several objects of the invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

I claim:

1. In an electric motor or other dynamoelectric machine having a stator assembly with a bore therein, a rotor assembly including a rotor shaft, a bearing for rotatably journalling said shaft with said rotor assembly received in said bore, and a support for said bearing, means for transferring axial thrust from said shaft to said bearing support, said bearing having an opening therethrough for application of lubricant to said bearing and to the portion of said shaft journalled within said bearing, a portion of said bearing support being spaced generally outwardly of said bearing opening wherein the improvement comprises:

a feeding wick of lubricant absorbent material having a first portion thereof projecting into said opening in said bearing and positively engaging said shaft, and a tapered second portion cammingly engagable with said portion of said bearing support when said feeding wick is in its installed position; and a retaining member engagable by said thrust transfer means and engagable with said feeding wick for holding said feeding wick in its installed position and for cammingly forcing said first portion of said feeding wick inwardly so as to positively maintain lubricating contact between said feeding wick and said shaft, said feeding wick having a third portion thereof for application of lubricant to said thrust transfer means when said feeding wick is in its installed position, and said retaining member having a notch therethrough for reception of said third wick portion.

2. In an electric motor as set forth in claim 1 wherein said retainer member has at least two alignment holes therethrough, and wherein said bearing support has a pair of locating pins for reception of said retainer member alignment holes.

3. An end shield and lubricating system for an electric motor, the latter having a stator assembly and a rotor assembly, said rotor assembly having a rotor shaft extending axially outwardly therefrom and being rotatably mounted within said end shield, the latter being securable to said stator assembly with said rotor assembly journalled therein, means for transferring axial thrust from said rotor shaft to said hub, said end shield having a central hub including a cup portion which faces inwardly of said motor, a bearing pillow within said cup, a bore through said pillow, a sleeve bearing fitted within said bore, said sleeve bearing being adapted to receive and to journal said rotor shaft therein, an opening in said pillow adjacent said sleeve bearing, a window in said sleeve bearing in register with said opening, a feeding wick of lubricant absorbent material so structured and shaped as to be received within said opening, said feeding wick having a first portion insertable through said window for contact with said rotor shaft thereby to dispense lubricant onto said shaft and into said sleeve bearing, a second portion adapted to cammingly engage a portion of said pillow substantially opposite said window upon axially forcing said feeding wick toward the cam portion of said pillow for ensuring that said first portion of said feeding wick is positively maintained in lubricating contact with said shaft, a retainer plate engagable by said thrust transfer means for forcing said feeding wick toward said cam portion of said pillow, and a reservoir wick holding a supply of said lubricant, said lubricating wick being in lubricant transfer relation with said feeding wick, said retainer plate having at least two alignment holes therethrough and said pillow having a pair of locating pins extending inwardly of said motor for reception of said retainer plate alignment holes.

4. An end shield and lubricating system for an electric motor, the latter having a stator assembly, a rotor assembly and an end shield, said rotor assembly having a rotor shaft extending axially outwardly therefrom and being rotatably mounted within said end shield, the latter being securable to said stator assembly with said rotor assembly journalled therein, said end shield having a central hub including a cup portion which faces inwardly of said motor, means for transferring axial thrust from said rotor shaft to said hub, a bearing pillow within said cup, a bore through said pillow, a sleeve bearing fitted within said bore, said sleeve bearing being adapted to receive and to journal said rotor shaft therein, an opening in said pillow adjacent said sleeve bearing, a window in said sleeve bearing in register with said opening, a feeding wick of lubricant absorbent material so structured and shaped as to be received within said opening, said feeding wick having a first portion insertable through said window for contact with said rotor shaft thereby to dispense lubricant onto said shaft and into said sleeve bearing, a second portion adapted to cammingly engage a portion of said hub substantially opposite said window, a retainer plate engagable by said thrust transfer means for forcing said feeding wick toward said cam portion of said hub thereby to ensure that said first portion of said feeding wick is positively maintained in lubricating contact with said shaft, and a reservoir wick holding a supply of said lubricant, said lubricating wick being in lubricant transfer relation with said feeding wick, wherein said feeding wick has a third portion extending inwardly of said motor for contact with said reservoir wick and a fourth portion extending inwardly of said motor for application of lubricant to said thrust transfer means on said rotor shaft, said retainer plate having openings or notches therein permitting said third and fourth portions of said first wick to extend inwardly into said motor beyond said retainer plate, and said retainer plate having at least two alignment holes therethrough and said pillow having a pair of locating pins extending inwardly of said motor for reception of said retainer plate alignment holes, said locating pins on said pillow and said alignment holes in said retainer plate being assymmetrical relative to an axis of said bore in said pillow whereby said retainer plate may only be installed in its proper position with the third and fourth portions of the feeding wick extending through said openings and notches in said retainer plate.

\* \* \* \* \*